March 25, 1969    D. B. BOSWORTH ET AL    3,434,609
APPARATUS FOR TRANSFERRING HEAVY OBJECTS
BETWEEN VERTICALLY SPACED LEVELS
Filed Sept. 26, 1966

INVENTORS
Delbur B. Bosworth
Arthur S. Christy
Fernand L. La Rochelle

By Alliot Gora
ATTORNEY

United States Patent Office 3,434,609
Patented Mar. 25, 1969

3,434,609
APPARATUS FOR TRANSFERRING HEAVY OBJECTS BETWEEN VERTICALLY SPACED LEVELS
Delbert B. Bosworth, Arthur S. Christy, Jr., and Fernand L. La Rochelle, Portland, Maine, assignors to United Industrial Syndicate, Inc., Portland, Maine, a corporation of New York
Filed Sept. 26, 1966, Ser. No. 581,838
Int. Cl. B66f 11/00
U.S. Cl. 214—95                15 Claims

ABSTRACT OF THE DISCLOSURE

Apparatus for transferring heavy objects between vertically spaced levels, the apparatus including a table centrally supported by means to raise and lower it, the upper level having a shoulder and the table having a slide movable into shoulder-engaging position so that the shoulder becomes a table support in loading operations at the upper level, the slide being desirably part of a hinged plate, and the table having load centering means.

---

The present invention relates to apparatus for use in transferring heavy objects between vertically spaced levels.

While apparatus in accordance with the invention may be used in the vertical transfer of all types of loads, it is herein discussed with particular reference to its use in the transfer of heavy, cylindrical objects, paper rolls at a paper mill, for example, that can be rolled onto a vertically movable table or platform at one level and rolled therefrom at another level. Such heavy cylindrical objects present special problems relating to the support of the table while they are being rolled onto or off of it at an elevated level.

In accordance with the invention, the problem of support is overcome by providing the table with a crossover plate and with means operable to swing the crossover plate between a depending, inoperative position and a horizontal, operative position. The crossover plate includes a slide and means to extend and retract it relative thereto. With this combination, the table may be so located that, in one position, it is spaced horizontally from a level with the crossover plate, when horizontally positioned partially closing the gap. The slide may then be extended to overlie and be supported by a marginal shoulder extending lengthwise of the edge of the adjacent level thus to provide adequate support for the table while the load is being moved into or away from a position centrally thereof.

When the object is cylindrical, the table is provided with object engaging means operable to permit the object to be loaded onto the table, to hold the object in position while being raised or lowered, and also to have an additional function relative either to loading or unloading, a stop in the case of the former, and as a means of at least initiating the rolling of the object in the case of the latter.

In paper mills, by way of one example of such means, paper rolls are transferred from an upper level to a lower level where the roll cores are removed for return to the upper level. For the transfer of the rolls, the object engaging means comprise a pair of chocks provided with means to so actuate them that each may be moved upwardly from an inoperative position into at least one operative position with at least one chock being movable into a second operative position. While the second position can be used, with the other chock inoperatively positioned, to initiate movement in roll unloading, it is preferred that it be used to provide a stop in roll loading.

While such chocks may be used in transferring roll cores, the object engaging means, as another example thereof, may be a pair of chocks movable together into or out of a holding position and an ejector movable upwardly in the unloading direction to roll a roll core off the table.

Another objective of the invention is to provide control of an object ejected from the table by the operation of the object engaging means. By way of an example thereof, the core of a paper roll may be returned to the second level and deposited in a channel marginally thereof. The channel may be part of the marginal shoulder or spaced vertically therefrom. In either case the slide has two operative positions, in one, overlying the outer edge of the channel and in the other, resting on the marginal shoulder.

It is preferred that the means for actuating the table, crossover plate, slide, and object engaging means be hydraulically operated and that the control of such means ensures safe operation. By way of example, whenever the table is in position to receive the cylindrical object, a chock is in operating position to stop it in a position centrally of the table. As another example, the table cannot be lowered until the chocks are both in a roll-holding position and the slide is retracted and the table cannot be fully lowered until the crossover plate is in its inoperative position.

In the accompanying drawings, there is shown an embodiment of the invention illustrative of these and other of its novel features and advantages and, from a description of this embodiment other objectives of the invention will also be apparent.

By way of introduction to the apparatus in accordance with the invention and to its use, reference is first made to FIGURES 1–6 in which the apparatus is schematically shown.

The apparatus consists of a generally indicated table 25 adapted to be moved vertically between a position flush with the surface 26 into an elevated position spaced from but in the horizontal plane inclusive of an upper level 27. The table 25 includes a hinged plate 28 pivoted thereto to swing between a depending inoperative position upwardly into an operative horizontal position. It will be seen that the level 27 includes a horizontal, marginal shoulder 29 located slightly below the plane of the level 27 and a horizontal marginal channel 30 shown as spaced slightly below the shoulder 29. In the embodiment of the invention detailed in the drawings, provision is made for this spacing of the channel but the controls are predicated on the channel 30 and the shoulder 29 being at the same level.

The table 25 is so spaced relative to the level 27 that there is a gap between them even when the plate 28 is in its horizontal, operative position. For that reason the crossover plate 28 is provided with a generally indicated slide 31 movable between retracted and extended positions, the extended position permitting the slide 31 to rest on the shoulder 29 thus providing a firmly supported bridge between the level 27 and the table 25 to enable a heavy cylindrical object such as the paper roll R to be rolled onto the table 25 from the level 27 for transfer to the level 26.

The table 25 includes generally indicated chocks 32 and 33 each of which is adapted to be raised from an inoperative position flush with the load supporting surface of the table 25 into an angular operative position of, say, 15° relative thereto, the two chocks then confining the roll R centrally of the table 25. When either chock is in its inoperative position, the roll R is, of course, free to roll over it. The invention also provides for the rear chock 32 being movable into a second operative or stop position in which it defines an angle of, say, 30° relative to the surface of the table 25.

Figure 1:
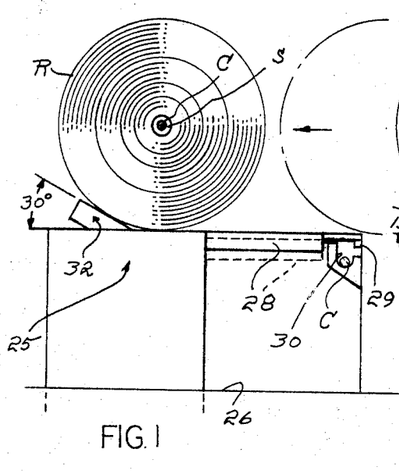
FIGURE 1 is a schematic view illustrating the transfer of a heavy roll to the table in an elevated position.

By way of example and as shown in FIGURE 1, the rear chock 32 defines an angle of 30° to the table surface when the table is in its raised position while the other or front chock 33 is in its inoperative position. The chock 32 is thus available to serve as a stop for the paper roll R when the latter is rolled onto the table 25 from the level 27.

Figure 2:
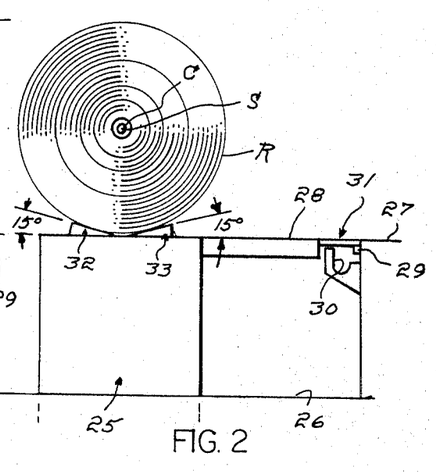
FIGURE 2 is a like view illustrating the chocks in a holding position.
Figure 3:
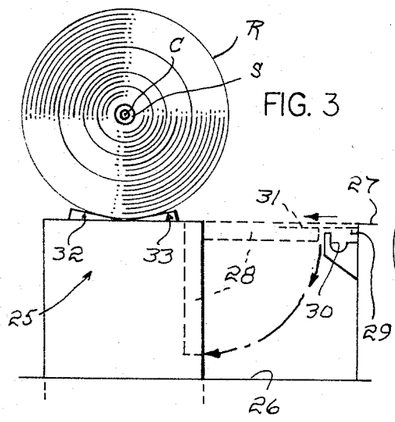
FIGURE 3 is a like view but with the slide retracted and the crossover plate lowered into its inoperative position.

As illustrated by FIGURE 2, both chocks are used to hold the roll R centrally of the table 25 when it is to be raised or lowered. For this purpose, the chock position of approximately 15° relative to the table surface is adequate and, accordingly, the rear chock 32 is lowered while the front chock 33 is raised. When the roll R is to be lowered, see FIGURE 3, the slide 31 is retracted and as the plate 28 is now free to swing downwardly into its inoperative position and is so swung, the table 25 may then be lowered.

Figure 4:
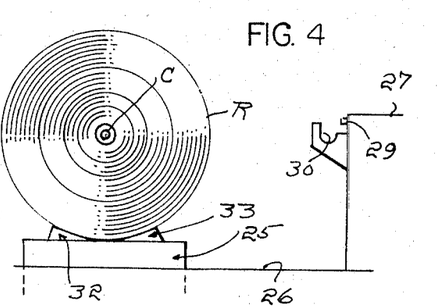
FIGURE 4 is a similar view with the table in an intermediate position during which the roll core is removed.
Figure 5:
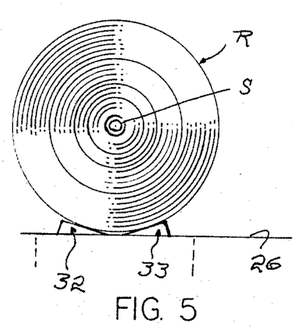
FIGURE 5 is a view showing the table in its lowermost position.
Figure 6:
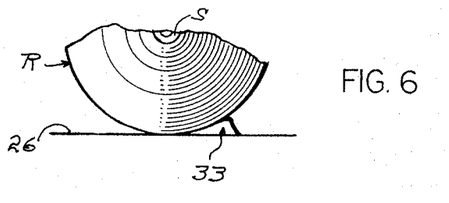
FIGURE 6 illustrates the lowering of the rear chock to permit the roll to be rolled from the table.
Figure 7:
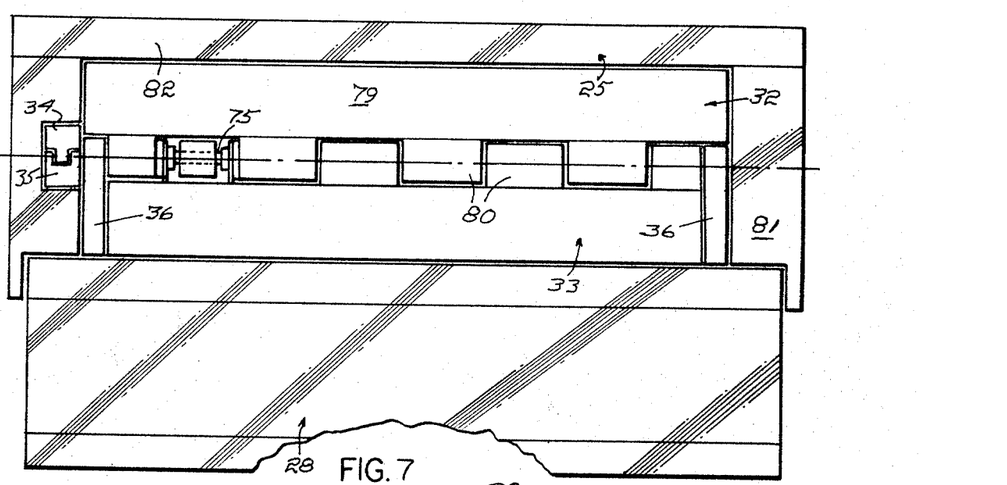
FIGURE 7 is a top plan view of the table with the crossover plate in its operative position.

Before the paper roll R is shipped, its core C, by itself a cylindrical object that is so heavy as to be difficult to handle manually, is withdrawn and is usually slid onto a suitable support, not shown, located adjacent one end of table 25. In FIGURE 4, the table 25 is shown as stopped at a height convenient for such withdrawal. After the core withdrawal, the table 25 is lowered to be flush with the surface 26 as is illustrated by FIGURE 5. The rear chock 32 is then lowered into its inoperative position so that the roll R may now roll from the table 25. The invention contemplates that by now raising the chock 33 to, say, an angle of 30° relative to the table 25 movement of the roll R may be initiated. As, however, safety measures would, in that case be required to insure nothing was in the path of the roll R, the circuitry detailed in FIGURES 23 and 24 does not provide for such roll-ejecting movement of the chock 33. The table 25 is then raised to a height convenient for sliding the core C thereon. Normally chocks 32, 33 are used to hold the core C centered on the table 25. Stops 35, see FIGURE 7, are operable to a raised position similar to that described for chocks 32 and 33. In such raised positions, they may center the core C on the table 25 but their basic purpose is to provide a stop position for sleeves S enabling the core C to be inserted therethrough. Such sleeves normally slid over the core C remain with the roll of paper when the core C is extracted as previously explained.

Figure 22:
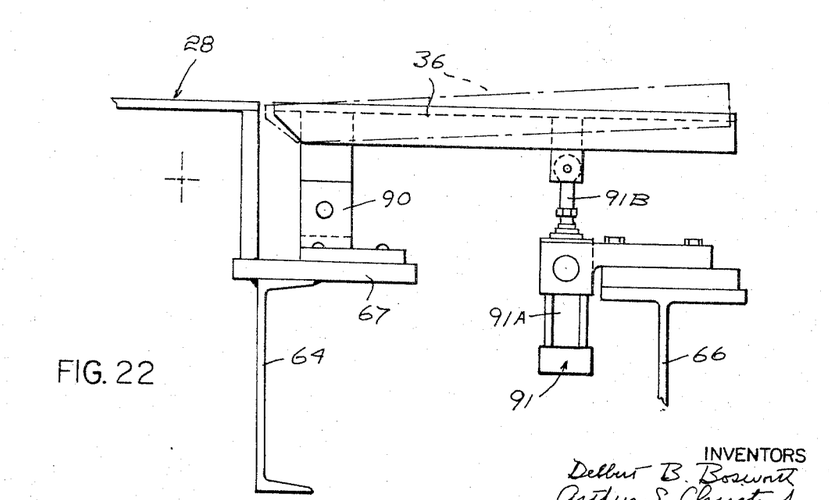
FIGURE 22 is a side view, on an increased scale, of a core ejector.

After a core C has been placed on the table 25, the table 25 is so raised that its crossover plate 28 may be swung upwardly into its operative position and the slide 31 then extended. When the core C is to be transferred to the channel 30 and the outer edge of the channel 30 is below the shoulder 29, the table 25 is not freely raised, as will be apparent from FIGURE 1 and the slide 31 is initially only so extended as to overlie the outer edge of the channel 30. Then with the front chock 33 lowered into its inoperative position and the rear chock 32 raised from its 15° into its 30° position, the core C will be rolled forwardly into the channel 30. To ensure the desired core C movement core ejectors 36, hereinafter described in connection with FIGURE 22, are provided, and, when actuated, hasten and facilitate the movement of core C from table 25 to channel 30. The core C may then or at a subsequent time be removed for reuse either manually or by a device operable from the upper level 27. The table 25 is then freely raised and the slide 31 is fully extended with the rear chock 32 in its stop position so that the apparatus is again in position for the safe transfer of another roll R from the level 27 to the level 26.

The apparatus includes a base generally indicated at 37 so located as to support the load-supporting surface of the table 25 flush with the level 26 when in its lowermost position.

Figure 10:
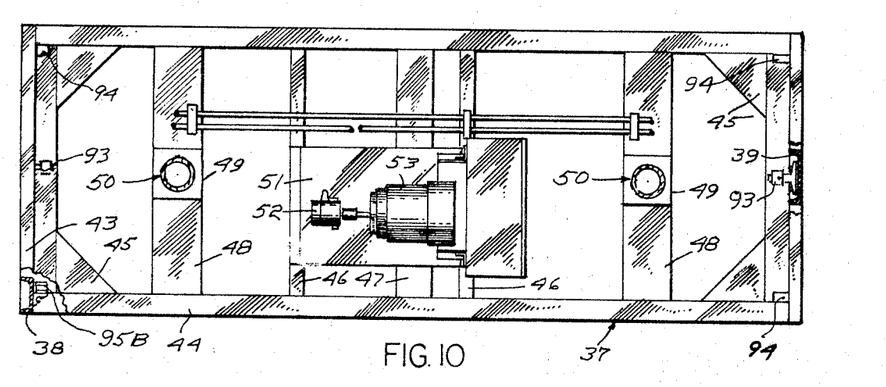
FIGURE 10 is a top plan view of the table-receiving base.
Figure 11:
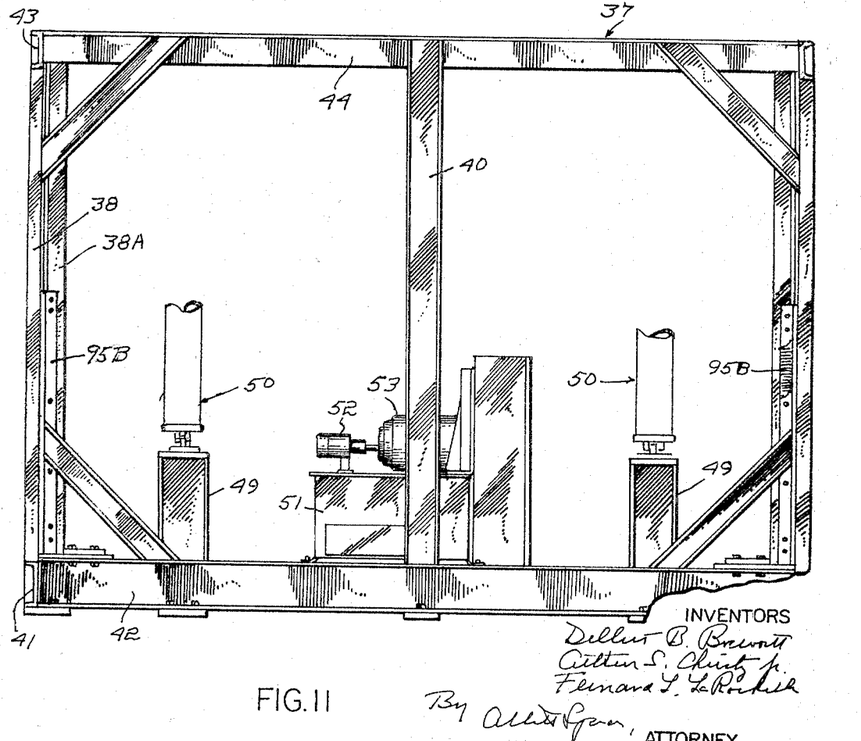
FIGURE 11 is a front view thereof.

In more detail, the base 37 comprises, see FIGURES 10 and 11, corner uprights 38, rails 38A, intermediate end uprights 39, and intermediate side uprights 40. The several uprights are interconnected by end beams 41 and side beams 42 at their bottom ends, and by end beams 43 and side beams 44 at their upper ends, thus to provide a framework dimensioned to receive the table 25 within it. For that reason, the bottom beams 41 and 42 are interconnected to provide a support 45 at each corner. In addition the bottom side beams 42 are interconnected by cross members 46 and 47 to provide a bed and by cross members 48, one for each of the mounts 49 for the generally indicated hydraulic rams 50, one between the bed and each end of the base 37.

Mounted on the bed are certain components of the hydraulic system such as the tank 51, the pump 52, and its motor 53. Each ram has its cylinder 50A pivotally mounted as at 54 to an appropriate one of the mounts 49 and its piston 50B is similarly connected as at 55 to the table 25. See also FIGURE 9. On the delivery of oil under pressure to each cylinder 50A or on its relief therefrom, the table 25 is raised or lowered to the desired extent by controls subsequently to be described.

Figure 8:
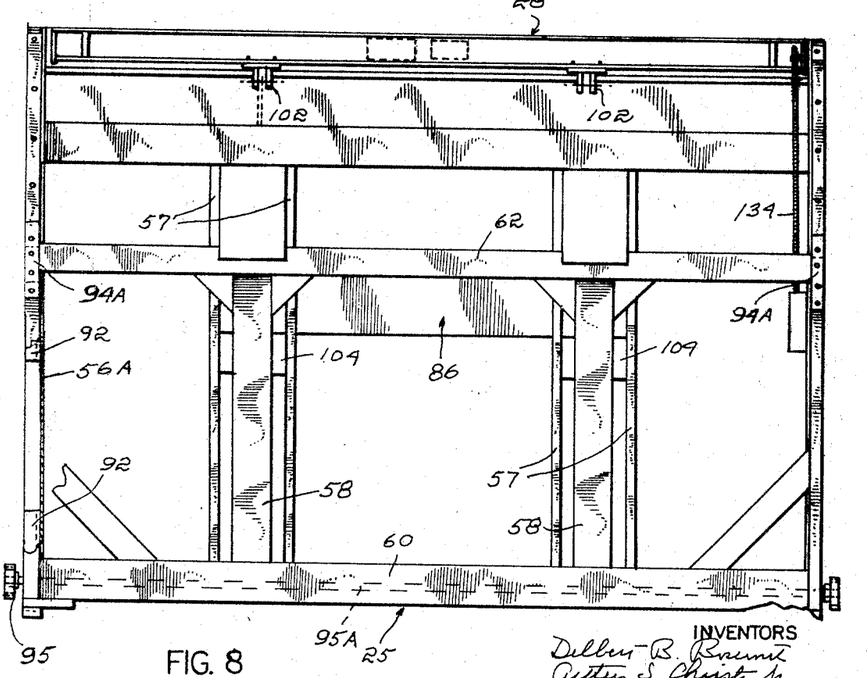
FIGURE 8 is a front view thereof.
Figure 9:
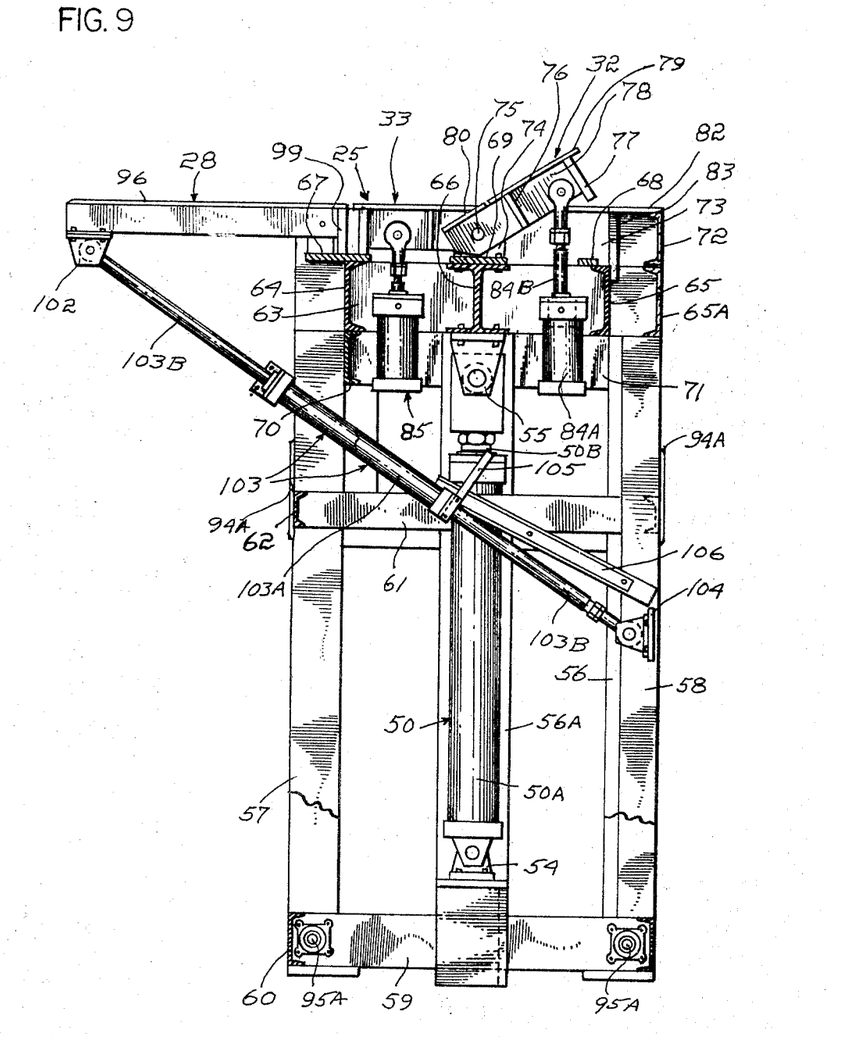
FIGURE 9 is a vertical cross section of the table.

The table 25 similarly includes, see FIGURES 7–9, corner uprights 56, intermediate end uprights 56A, rear uprights 57, and front uprights 58. These uprights are interconnected at their bottom ends by end and side members 59 and 60, respectively, and, in an intermediate zone, by end and side members 61 and 62, respectively.

A frame consisting of end members 63, a front member 64, and a pair of rear members 65 and 65A interconnects the uprights of the table 25 adjacent but below their upper ends. The frame members are shown as of channel stock and with the members 64 and 65 flush with the inner surfaces of the uprights to which they are secured and with the other frame members flush with the outer surfaces of the appropriate platform uprights. An I-beam 66 interconnects the end members 63 centrally of their ends and the mounts 55 to which the platform-raising pistons 50B are pivotally connected to the undersurface of the beam 66. Supports 67, 68, and 69 are secured to the upper surface of the beams 64, 65, and 66, respectively. Front and side channel members 70 and 71, respectively, are secured to the appropriate platform uprights, the front member 70 being flush with the rear surfaces of the front uprights of the table 25 and the members 71 flush with the outer faces of the appropriate uprights thereof. Rear and end channel members 72 and 73, respectively, are secured to the appropriate platform uprights above the frame and these are also flush with the outer surfaces thereof.

The support 69 is provided with mounts 74 to which the chocks 32 and 33 are connected by a pivot 75. Each chock consists of a frame formed by lengthwise supports 76 and 77 and transverse supports 78 connected thereto. Each chock is completed by a floor plate 79 extending from end-to-end of the outer part of its frame and by floor plates 80, each secured to the inner ends of each pair of transverse supports 78 thus to provide alternate open spaces for the corresponding portions of the other chock. The pivot 75 extends through the inner ends of the supports 78 of both chocks.

In their inoperative position, the chocks rest on the supports 67 and 68 with their floor plates flush with the end floor plates 81 secured to the members 72 and 73 and the rear floor plate 82 secured to the channel member 72 and to a reinforcing member 83 secured to the frame member 65.

Each chock may be pivoted independently of the other. To this end, the cylinder 84A of a generally indicated hydraulic ram 85 is pivotally secured by a table frame member with its piston 84B pivotally connected thereto. The hydraulic rams 85 are actuated by oil delivered thereto by the pump 52 with the controls therefor presently to be described. While the valves are effecting the control of the flow of oil relative to the above referred to and other rams later to be described are shown schematically in FIGURES 23 and 24, they are not otherwise shown. The valves for the rams 85 and the rams for the crossover plate 28, the slide 31, the core stops 35 and the ejectors 36 are within a housing 86 carried by the table 25.

Figure 20:
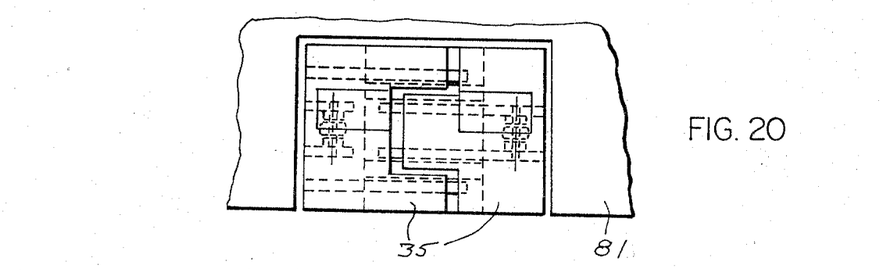
FIGURE 20 is a top plan view, on an increased scale of the stops or chocks for holding the roll core.
Figure 21:
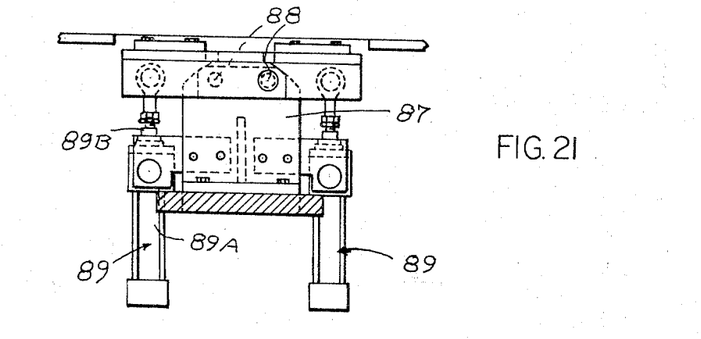
FIGURE 21 is a side view thereof.

The stops 35 comprise a stop for the roll core sleeves S and these may best be seen in FIGURES 20 and 21. A support 87 secured to the framework of the table 25 has a pair of parallel pivots 88, one for each stop 35 and on a side of the center line of the table 25 opposite to the other. Each stop 35 is under the control of a generally indicated ram 89 having its cylinder 89A pivotally connected to the support 87 and its piston 89B pivotally connected to the appropriate one of the stops 35. The stops 35 are raised together from their inoperative position by the delivery of oil under pressure to their rams 89 whose valves are of the type provided with springs (not shown) operable to cause the stops 35 to return to their inoperative position when the appropriate control valve is closed.

The ejectors 36 extend rearwardly across the center line of the table 25. Each ejector 36 is pivotally connected at its forward end to a mount 90 secured to the framework of the table 25. Adjacent its free end, each ejector 36 has the piston 91B of a generally indicated ram 91 pivotally secured thereto. The ram cylinders 91A are pivotally supported by the table framework. The rams 91 are also of the type that are caused to return to their inoperative position through the action of the spring controlled valve therefor.

It will be noted that each of the intermediate end uprights 56A of the table 25 is provided with vertically alined shoes 92 slidable along tracks 93 with which each of the intermediate end uprights 39 of the base 37 is provided. The side beams 44 at the upper edge of the base 37 have rollers 94 adjacent their ends engageable with shoes 94A fixed on the corner members 56 of the table 25 when the table 25 is in its raised position. In addition, means are provided to equalize the action of the rams 50, such means being in the form of pinions 95 at each end of the shafts 95A at the bottom edge of the table 25 and engageable with racks 95B secured to the members 38 at the base 37.

Turning now to the crossover plate 28, it will be noted that it comprises a floor 96 supported by a series of transverse supports 97 interconnected at their outer ends by a cross plate 98 secured to the bottom edges thereof and at their inner ends by an end wall 99. Between certain pairs of the supports 97 are pivots 100 entrant of slots 101 in the mounts 102 secured to the frame member 64. The location of the pivots 100 is such that, in the inoperative position of the crossover plate 28, it depends in the space between planes defined by the front and back surface of the table uprights at the front thereof and above the intermediate upright connecting member 62. In the depending position of the crossover plate 28, the end wall 99 is flush with the platform surface as is the floor plate 96 in the operative position of the crossover plate 28.

The cross plate 98 is provided with two, transversely spaced pairs of ears 102. Hydraulic rams, generally indicated at 103, each comprise a pair of reversed, interconnected cylinders 103A with the plunger 103B of one pivotally connected to one of the pairs of ears 102 and the plunger 103B of the other pivotally connected to an appropriate one of the mounts 104 interconnecting pairs of uprights 57 of the table 25. One of the interconnected cylinders 103A is provided with a runner 105 in engagement, in any position of the cylinders 103A, with a slideway 106 carried by the framework of the table 25. On the delivery of liquid under pressure to the cylinders 103A or on its escape therefrom, as by control means later to be described, the crossover plate 28 is swung upwardly into its approximately horizontal, operative position or downwardly into a depending, inoperative position.

Tracks 107 are secured to the bottom edge of the supports 97. The generally indicated slide 31 comprises a series of pairs of side members 108, each pair interconnected by a header 109 and supporting a floor plate 110, one pair of side members 108 between each two supports 97. Each support 97 has a roller 111 at each side close to its outer end and each side member 108 has a roller 112 disposed to travel along an appropriate one of the tracks 107. The side members 108 are also interconnected by a tie plate 113 disposed to engage the cross plate 98 as a stop limiting outward movement of the slide 31 relative to the crossover plate 28.

The slide 31 is moved outward or retracted by a series of generally indicated hydraulic rams 114 whose cylinders 114A are backed by the end wall 99 and their pistons 114B are attached to an appropriate one of the headers 109. Oil is delivered to the cylinders 114A or permitted to escape therefrom to extend or retract the slide 31 by control means presently to be described.

As the circulation of the oil to and from the various rams is conventional, the hydraulic system is not shown. The solenoid valves are, however, schematically shown in FIGURES 23 and 24 as part of the circuitry. The circuitry features, limit switches and their locations and functions will next be described.

Figure 14:
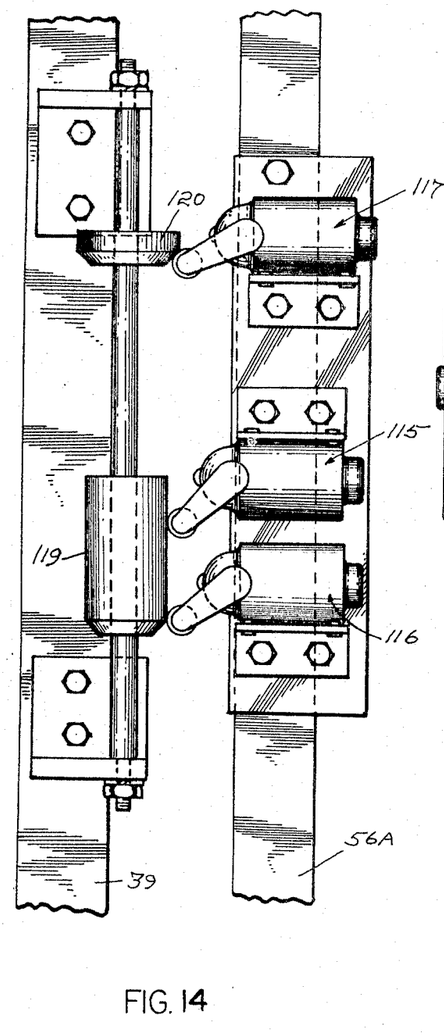
FIGURE 14 is a fragmentary view showing certain end uprights of the base and the table and the limit switches actuated in response to upward movements of the table.
Figure 15:
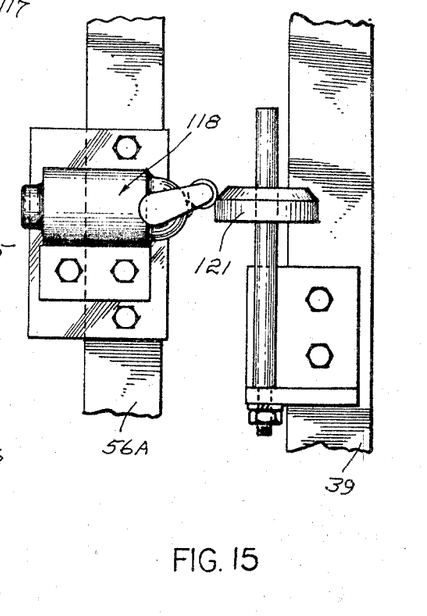
FIGURE 15 is a like view but illustrating the limit switch actuated when the table is at its lowermost position.
Figure 16:
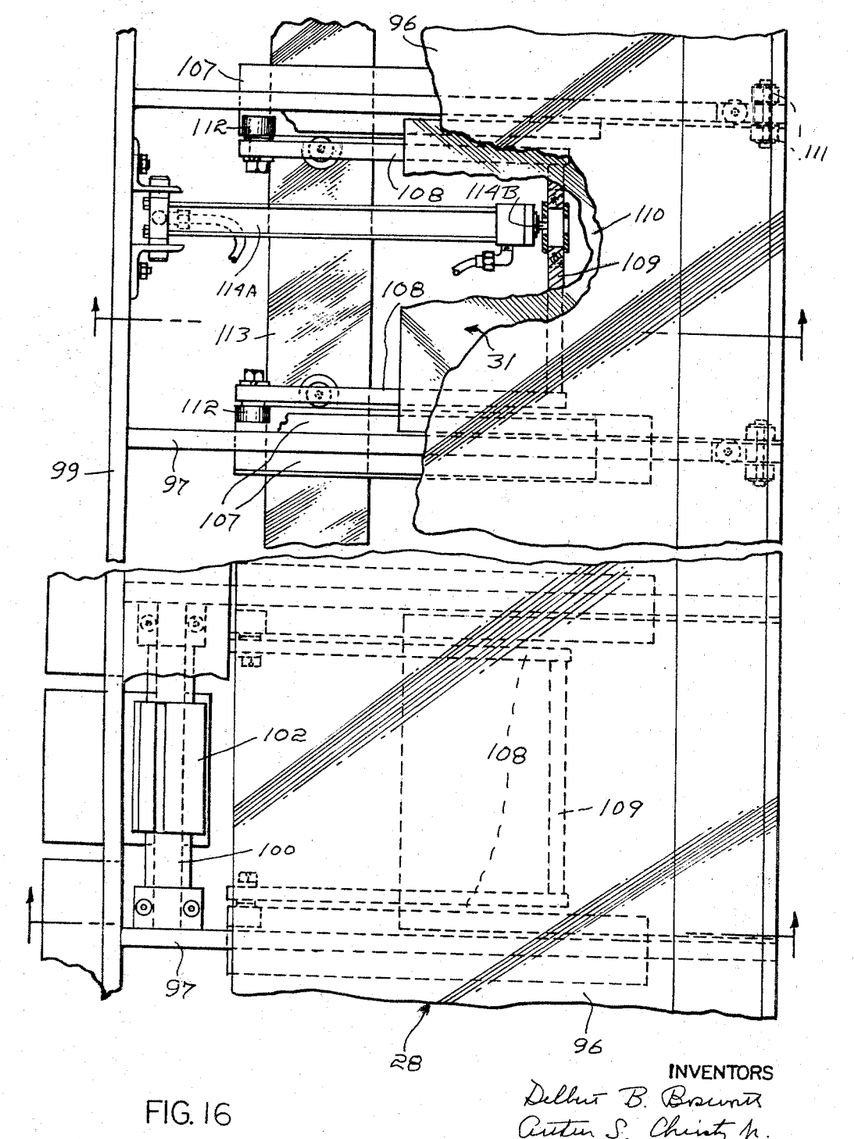
FIGURE 16 is a fragmentary and partly broken-away plan view of the crossover plate and its slide.
Figure 17:
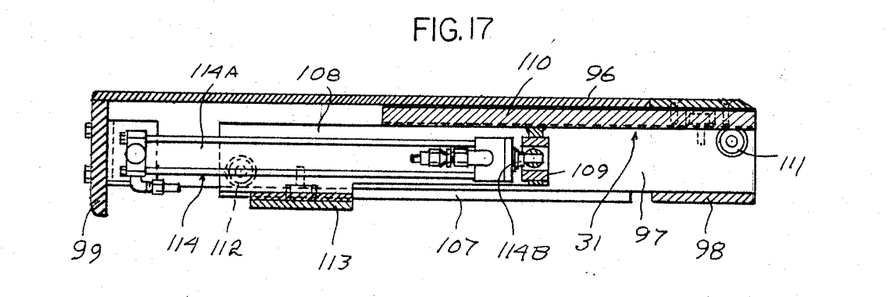
FIGURES 17 and 18 are sections taken, respectively, along the indicated lines 17—17 and 18—18 of FIGURE 16.
Figure 18:
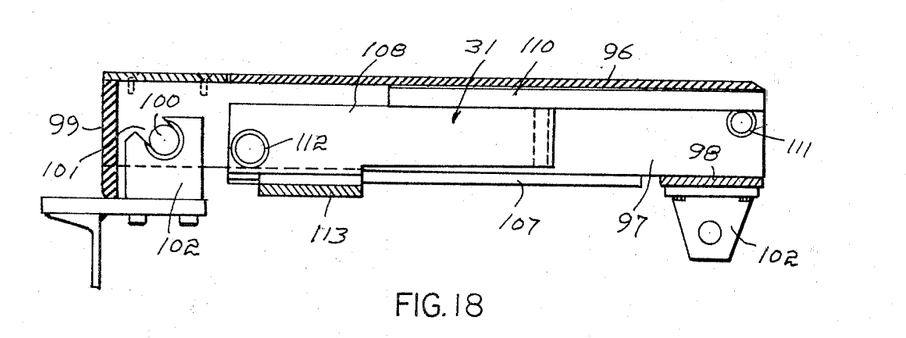

The control of vertical movements of the table is effected by solenoid valves in the lines leading to and from the cylinders 50A. Upward movement of the table 25 results in the actuation of limit switches 115, 116, and 117, see FIGURE 14, and its downward movement is operative to actuate the limit switch 118. The switches 115, 116, and 117 are mounted along one edge of one of the intermediate end members 56A of the table 25 and the switch 118 is mounted on the other edge thereof. Actuators 119, 120, and 121 are carried by the base upright 39 and these are so vertically spaced that on upward movement of the table 25, the switch 115 engages the actuator 119 when the table 25 has moved upwardly a distance such that the crossover plate 28 is clear of the base 37 and hence may be swung upwardly, the switch 116 is not used as the stop 29 and channel 30 are at the same level in the embodiment represented by the circuitry shown in FIGURES 23 and 24. The switch 117 is operated by the actuator 120 at the extreme upper position of the table 25, the position for roll-loading and core-ejecting. On down travel of the table 25, the switch 118 is opened by engagement with the actuator 121 when the table is at the roll-unloading level.

Figure 12:
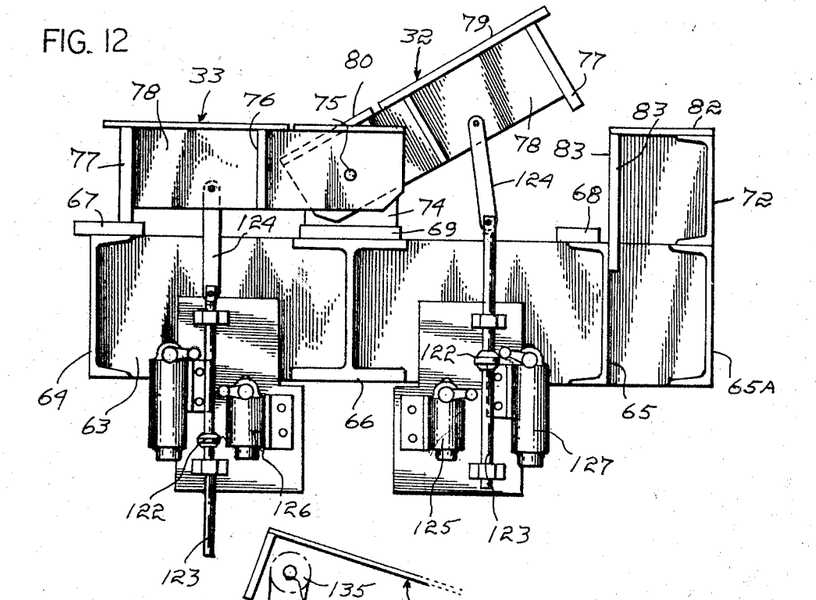
FIGURE 12 is a fragmentary vertical cross section of the table, on an increased scale, showing the limit switches for the chocks.

The position of the roll engaging chocks 32 and 33 is also controlled by limit switches. For that purpose, see FIGURE 12, an actuator 122 is fixed on a rod 123 slidably supported by the table framework below one end of each chock to which it is connected by a link 124. The actuators 122 so control limit switches, the switch 125 for the chock 32 and the switch 126 for the chock 33 that the appropriate chock is stopped when in a position in which it defines an angle of 15° relative to the load supporting surface of the table 25. A second limit switch 127 is operated by the actuator of the rear chock 32 and limits its maximum angular relationship to 30° as is desirable when it is to function as a roll stop. A like second limit switch 128 is shown for the front chock 33 if the second position thereof is desired.

Figure 13:
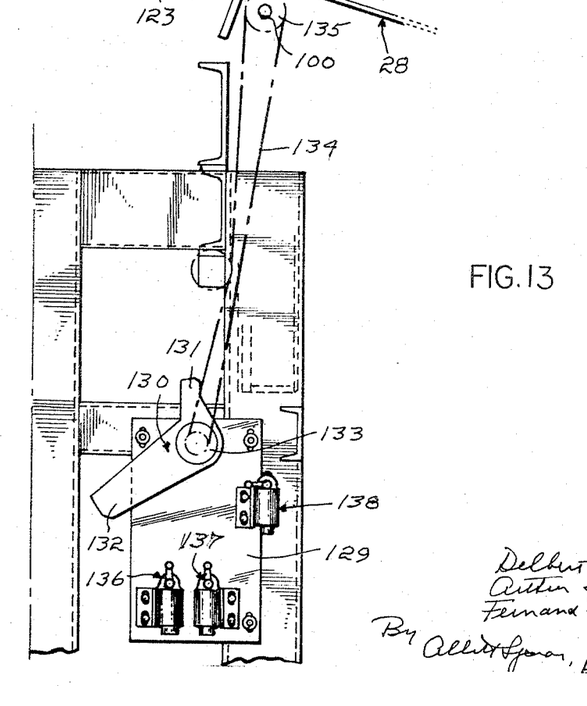
FIGURE 13 is a fragmentary vertical section of the table illustrating the limit switches operated by the swinging of the crossover plate between its operative and inoperative positions.

Limit switches are also actuated by the swinging of the crossover plate 28 between its operative and inoperative positions. A mount 129, see FIGURE 13, is secured to one of the front corner uprights 56 and it carries a rotatable actuator 130 having a short arm 131 and a long arm 132 and a sprocket 133 connected as by a chain 134 to a sprocket 135 fast on one of the pivots 100. By this arrangement, swinging movement of the crossover plate 28 is attended by corresponding turning of the actuator 130. When the actuator 130 is turned, as the plate 28 is swung upwardly, the long arm 132 first engages the limit switch 136, the plate 28 then being in a position in which certain control features may be initiated and then engages the limit switch 137 enabling the slide 31 to be extended. When the crossover plate 28 is in its depending, inoperative position, the short arm 131 engages the limit switch 138.

Figure 19:
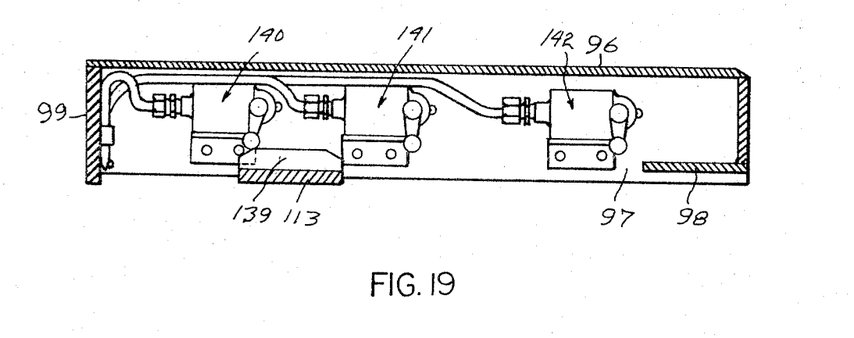
FIGURE 19 is a similar section of the crossover plate showing the limit switches operated by the slide.

Limit switches are also actuated by movement of the slide 31 relative to the crossover plate 28. For that purpose, see FIGURE 19, the tie plate 113 of the slide 31 carries an actuator 139 while a series of normally open limit switches 140, 141, and 142 are spaced lengthwise of one of the supports 97 of the crossover plate 28. Of these, the limit switch 140 is closed when the slide 31 is fully retracted, the limit switch 141 is closed when the slide 31 has been extended into a position appropriate for core ejection into the channel 30, and the limit switch 142 is closed when the slide is fully extended, a position appropriate for roll loading.

In practice, the circuitry takes advantage of the several limit switches to ensure safe operation and the wiring is herein discussed with reference to control from two stations, one for each level, for example.

Figure 23:
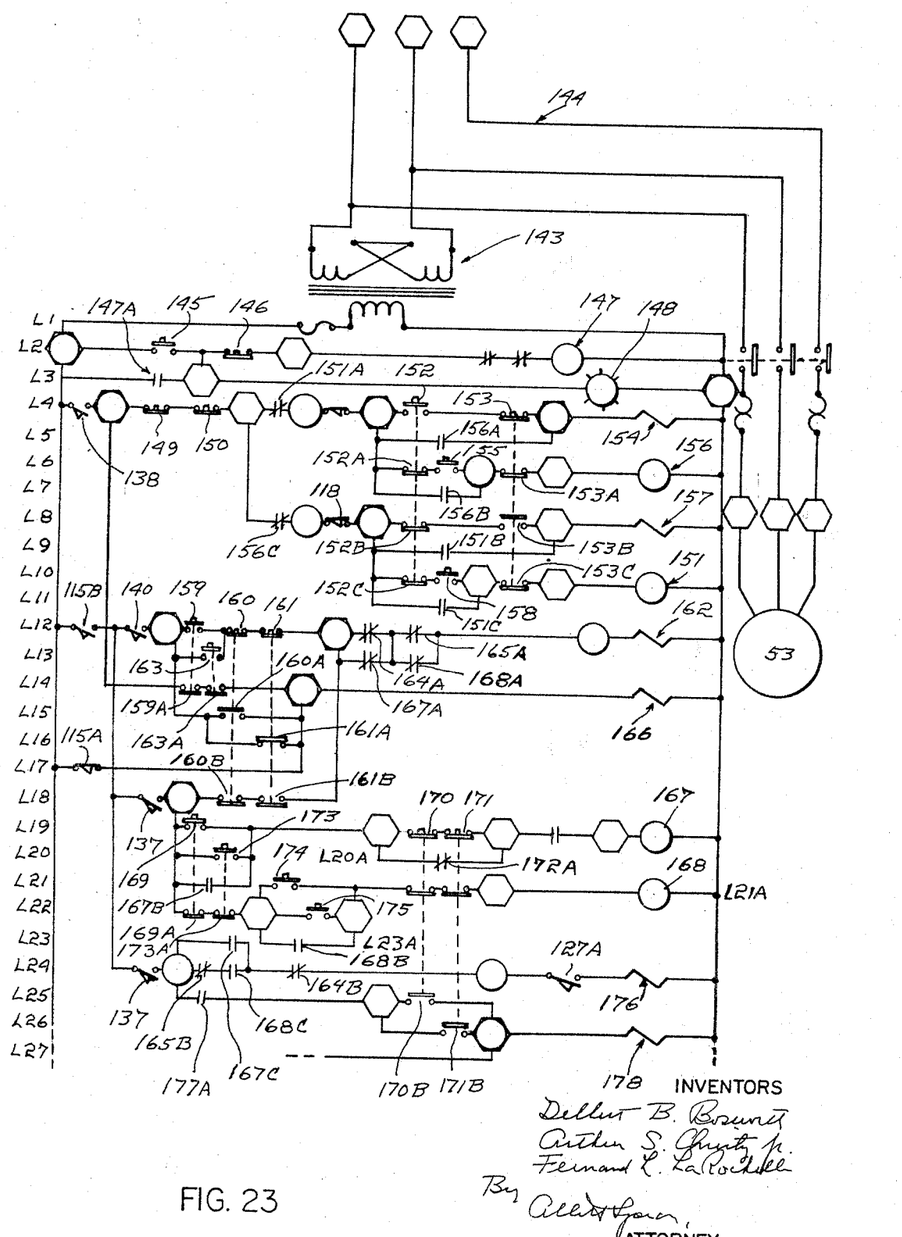
FIGURE 23 is a schematic view of part of the circuitry.
Figure 24:
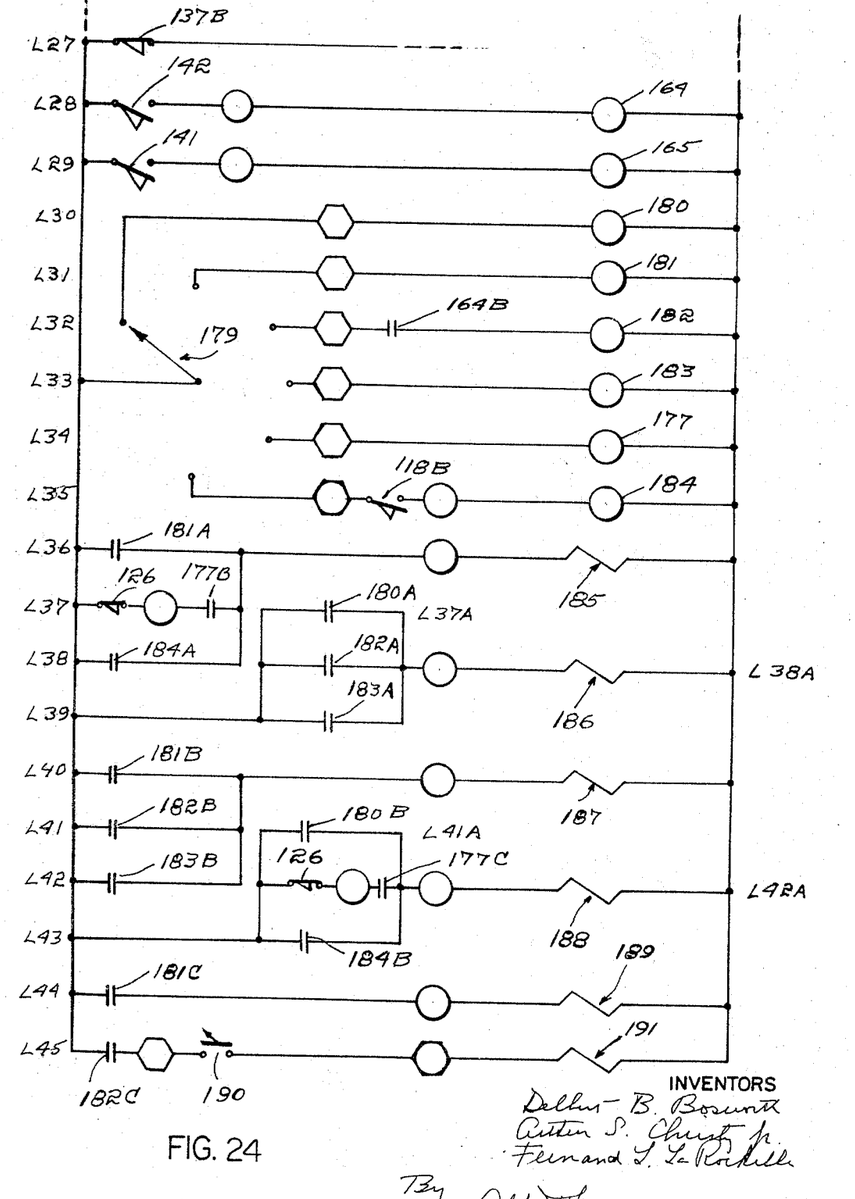
FIGURE 24 is a like view of the remainder thereof.

In FIGURES 23 and 24, the circuitry is schematically shown with vertically numbered parallel leads from a transformer 143 in the circuit 144 to the pump motor 53. The parallel leads are numbered L1–L45, L1 being connected to the transformer 143. As some of the limit switches control two leads, one position of such a switch is distinguished by the suffix addition "A" to its reference numeral and the suffix addition "B" to indicate its other circuit-completing position.

Parallel lead L2 includes a normally open starting switch 145, a normally closed stopping switch 146 and a pump starting relay generally indicated at 147 which, when energized, closes the circuit 144 to the motor 53. Parallel lead L3 includes a light 148 indicative that the pump is in operation and the normally open switch 147A of the starting relay 147 with the leads L2 and L3 so interconnected that the lead L3 functions as a holding circuit once the switch 145 is closed.

Parallel leads L4–L11 are concerned with the raising and lowering of the table 25. Parallel lead L4 includes the limit switch 138 and is the lead controlling upward and downward movement of the table 25. Limit switch 138 is normally open and is closed when the crossover plate 28 is down. The lead L4 also includes normally closed table "stop" switches 149 and 150, one for each control station, the parallel lead L8, the normally closed switch 151A of a relay 151 in the lead L10, the parallel leads L5, L6, and L7, and the normally closed limit switch 117 which is opened when the table 25 is raised to the maximum extent for roll-loading or core-ejection. The lead L4 also includes the normally open, table "up" switch 152, the normally closed table "down" switch 153 both at the first station and the generally indicated solenoid valve 154 controlling the flow of oil to the cylinders 50A.

Keyed to the switch 152 is a normally closed switch 152A in the lead L6 which also includes a normally open, table "up" switch 155 at the second station and a normally closed switch 153A keyed to the table "down" switch 153. The lead L6 includes the relay 156 having a normally open switch 156A in the lead L5 which is connected to the lead L4 so that the lead L5 becomes a holding circuit when the relay 156 is energized. The lead L7 includes the normally open switch 156B of the relay 156 and is so connected to the lead L6 as to serve as a holding circuit for that lead when the relay 156 is energized. The table 25 can, therefore, be raised provided that the crossover plate 28 is in its depending, inoperative position.

The limit switch 138 and the platform stop switches 149 and 150 also control the parallel lead L8 which has a normally closed switch 156C opened when the relay 156 is energized, the normally closed limit switch 118 closed except when the table 25 is in its down position, the parallel leads L9, L10, and L11. The lead L8 also includes a normally closed switch 152B keyed to the platform "up" switch 152 at the first station, a normally open switch 153B keyed to the platform "down" switch 153 at the first station, and the generally indicated solenoid operated valve 157 which, when open, permits the escape of oil from the cylinder 50A. The lead L10 includes a normally closed switch 152C also keyed to the platform "up" switch 152, the normally open, "down" switch 158, at the second station, the normally closed switch 153C keyed to the platform "down" switch 153 at the first station, and the relay 151. The lead L9 has the normally open switch 151B of the relay 151 and is so connected to the lead L8 as to serve as a holding circuit for the solenoid valve 157 when the normally open switch 158 is closed. The lead L11 is provided with the normally open switch 151C of the relay 151 and is so connected to the lead L10 as to function as a holding circuit for the relay 151 when the normally open switch 158 is closed.

It will thus be apparent that the table 25 can be lowered whenever the crossover plate 28 is in its depending, inoperative position.

Parallel leads L12–L25 are concerned with the positioning of the crossover plate 28 and its slide 31. Lead L12 contains the limit switch 115 which is closed when the table 25 has been so raised as to enable the upward swinging of the plate 28 to be safely initiated. The limit switch 115 also controls the lead L17 and as it normally maintains the lead 17 closed, it is identified as 115A in the lead L17 and as 115B in the lead L12. The lead L12 is also closed to the lead L18 and the lead L24 so that they are also controlled by the limit switch 115. The lead L12 also contains the normally open limit switch 140, closed when the slide 31 is retracted, the normally open plate "up" switch 159 at the first station, the normally closed, plate "down" switches 160 and 161 one at each station, and the generally indicated solenoid valve 162 which, when opened effects upward swinging of the cross over plate 28. The lead L13 includes the normally open, "up" switch 163 at the second station and is connected to the lead L12 so that the switch 152 is in parallel with the switch 159. The lead L12 also has the normally closed switch 164A and 165A of the relays 164 and 165, respectively. The relay 164 is in the lead L28 which is controlled by the limit switch 142 which is closed when the plate 31 is fully extended. The relay 165 is in the lead L29 which is controlled by the limit switch 141 which is closed when the slide 31 is at the channel 30. Thus when the slide 31 is in either of its positions of use, the lead to the solenoid 151 cannot be completed.

The lead L14 is connected to the lead L4 to be controlled by the limit switch 138 and includes a normally closed switch 159A and 163A connected thereto to open when the switches 159 and 163, respectively, are closed. The lead L14 also includes the generally indicated solenoid valve 166 which, when opened, causes the crossover plate 28 to swing downwardly.

The leads L15 and L16 are connected to the lead L12 to be in circuit when the limit switch 140 is closed. The lead L14 has a normally open switch 160A connected to the "down" switch 160 at the first station and the lead L16 has a normally open switch 160A connected to the switch 160 to be closed when the switch 160 is opened. The lead L15, the lead L16, and the lead L17 are all connected to the lead L14 so that any one of them may be used to operate the solenoid valve 166. The lead L17 is closed in the second position of the limit switch 115 and this position is indicated at 115A. It will thus be apparent that the solenoid valve 166 is open to relief by control of the "down" switches 160 and 161 and whenever the table 25 is below the zone in which it is safe to raise the crossover plate 28.

As stated, the leads L18 and L24 are in service whenever the table 25 is at or above the level at which the limit switch 115 closes the lead L12 and the leads L18–L26 are concerned with movements of the slide 31. The lead L18 includes the limit switch 137 which is closed when the crossover plate 28 is in its raised, operative position. The lead L18 also includes the normally closed switch 160B so connected to the "down" switch 160 as to open when it is opened and the normally closed "down" switch 161B connected to the switch 161 to open it. The lead L18 also includes the normally closed switches 167A and 168A of the relays 167 and 168, respectively, in the leads L19 and L21, respectively.

The lead L19 has a normally open first station switch 169 at the first station, normally closed switches 170 and 171, one at each station, with which the normally closed switch 172A in the lead L20A is in parallel. The switch 172A is part of a relay in the lead L34.

The lead L20 has a normally open switch 173 at the second station and the lead L21 includes the normally open switch 167B of the relay 167. The leads L20 and L21 are so connected to the lead L19 that their switches are in parallel with the switch 169 with the lead L21 serving as a holding circuit.

The lead L22 has normally closed switches 169A and 173A linked to the switches 169 and 173, respectively, to open when the switches 169 and 173 are closed. The lead L21A has a normally open switch 174 at the first station and the lead L23A has the normally open switch 168B of the relay 168. The leads L21A and L23A are connected to the lead L22 with their switches in parallel with the switch 175 in the lead L22 and located at the second station with the lead L23A serving as a holding circuit. The lead L21A also includes normally closed switches 170A and 171A linked to the switches 170 and 171 to open therewith. The lead L21A also includes the relay 168.

As previously stated, the lead L24 is in service whenever the limit switch 115 is in its "B" position and it is provided with the limit switch 137 thus to be operative when the crossover plate 28 is raised to its maximum extent. The lead L24 includes the parallel leads L23 and L25. In addition, the lead L24 includes, in series, a normally closed switch 165B of the relay 165 and the normally open switch 168C of the relay 168, with both of which the normally open switch 167C of the relay 167 is in parallel, the switch 167C being in the lead L23. In addition, the lead L24 includes a normally closed switch 164B of the relay 164, the limit switch 127 in its "A" position in which it is opened when the rear chock 32 is at an angle of 15°, and the generally indicated solenoid valve 176 which, when energized, results in the flow of oil to the slide-extending rams 114.

The lead L25 has the normally open switch 177A of the relay 177 in the lead L34 and the normally open switch 170B closed when the switches 170 and 170A are opened. The lead L26 contains the normally open switch 171B which is closed when the switches 171 and 171A are opened and the leads L25 and L26 are interconnected with the switches 170B and 171B in parallel. The lead L26 includes the generally indicated solenoid valve 178 by which the flow of oil effects the retraction of the slide 31. The lead L27 is also connected to the lead L26 and includes the limit switch 137 shown in the "B" position established when the crossover plate 28 is at or below the height at which the extension of the slide 31 may be initiated.

From the foregoing description of leads L18–L25, it will be seen that with the limit switch 115 closed, the slide 31 may be fully extended to be supported by the shoulder 29 or partially extended to overlie the outer edge of the channel 30 provided the limit switch 136 is in its "A" position and the limit switch 137 is closed by the crossover plate 28 being fully raised.

If either the switch 169 or the switch 173 is closed, the relay 167 is energized and the switch 167A thereby opened, thus opening the circuit in control of solenoid valve 162. The relay switch 167C in the lead L23 is also closed when the relay 167 is energized completing the circuit to the solenoid valve 176 if the limit switch 127 as well as the limit switch 137 is closed as it is when the rear chock 32 is in its 30° position.

When the slide 31 has been fully extended, the limit switch 142 is closed. The relay 164 is now energized with its switch 164B being thereby opened.

If either the switch 174 or the switch 175 is closed, the relay 168 is energized with its switch 168B being now closed to complete the circuit to the solenoid valve 176. When the slide 31 is at the outer edge of the channel 30, the limit switch 141 is closed energizing the relay 165 whose switch 165B is now opened to open the circuit to the valve 176. When either the arm return switch 170B or the arm return switch 171B is closed, the leads to the relays 167 and 168 are opened as is the lead to the valve 176 but the lead to the solenoid valve 178 is thereby completed to effect the retraction of the slide 31.

At one station, there is a selector switch for controlling the position of the chocks. The selector switch is generally indicated at 179 and is operable to connect the lead L33 to any one of the parallel leads L30, L31, L32, L33A, L34, and L35. Of these, the lead L30 includes the relay 180 and controls down movement of the chocks 32 and 33, the lead L31 includes the relay 181 and controls the core load positions of the chocks 35. The lead L32 includes the normally open relay switch 164B of the relay 164 and the relay 182 and provides for core ejection, the relay 164 being energized when the slide 31 overlies the outer edge of the channel 30. The lead L33A includes the relay 183 for the control of roll loading, the lead L34 includes the relay 177 for the control of roll centering, and the lead L35 includes the limit switch 118 in its "B" position, the down position of the table 25 and the relay 184 to control roll unloading.

The leads L36, L37, and L38 are interconnected so that each includes the generally indicated solenoid valve 185 by which the front chock 33 is raised.

The lead L36 includes the normally open switch 181A of the relay 181. The lead L37 is provided with the limit switch 126 closed when the front chock 32 is in its 15° position and the normally open switch 177B of the relay 177, and the lead L38 is provided with the normally open switch 184A of the relay 184. The valve 185 is accordingly open to raise the front chock 33 whenever the core loading lead L31 is connected to the lead L33 for core loading, the lead L34 closed to the relay 177 for roll centering, or the lead L35 closed to the relay 184 for roll unloading.

The lead L39 has the leads L36A and L38A connected in parallel thereto for the control of the generally indicated solenoid valve 186 controlling the lowering of the front chock 33 by means of the normally open relay switches 180A, 182A, and 183A of the relays 180, 182, and 183, respectively.

The lead L40 includes the leads L41 and L42 connected in parallel to it for the control of the generally indicated solenoid valve 187 controlling the raising of the rear chock by the normally open, parallel relay switches 181B, 182B, and 183B in the leads L40, L41, and L42, respectively. The chock 32 is raised, accordingly, whenever the core load, core eject, or roll load leads L31, L32, and L33, respectively, are closed.

The lead L43 has the leads L41A and L42A connected thereto in parallel and these have the parallel, normally open relay switches 184B, 180B, and 177C, respectively. The lead L42A also includes the limit switch 126 opened when the rear chock is in its 15° position, and the generally indicated solenoid valve 188 for effecting lowering of the rear chock 32. It will thus be seen that when either the table 20 is in its down position or when the lead L30 is closed or when the roll unloading lead L35 is closed, the chock 32 is lowered into its inoperative position. When the roll-centering lead L34 is closed, the chock 32 stops in its 15° position when the limit switch 126 opens.

The lead L44 is provided with the normally open switch 181C of the relay 181 and the generally indicated solenoid valve 189 for raising the core stop, stop 35 whose rams are spring-returned when the valve 189 is closed. The relay 181 is energized when the core loading lead L31 is closed. The lead L45 includes the normally open relay switch 182C of the relay 182, a normally open, manually operable switch 190 and the generally indicated solenoid valve 191 in control of the flow of oil to the rams actuating the core ejector 36, the rams being spring-returned when the valve 191 is closed.

From the foregoing, it will be apparent that the invention provides apparatus in which the space between the load-supporting table or platform and a level to or from which an object is to be transferred is bridged and further provides for the safe operation thereof.

We claim:

1. In apparatus for moving heavy cylindrical objects between a first level, and a second vertically spaced level at which there is a marginal shoulder, a load supporting table, means centrally of and below said table to move said table vertically between said levels, said table being spaced transversely from said shoulder at said second level, said table including crossover means having a portion slidable relative to said table between an inoperative position at said first level and an operative position at said second level, in said operative position, said crossover means overlying and engaging said shoulder while being rigidly secured to said table whereby said shoulder becomes a second supporting means for said table, object engaging means carried by said table movable between inoperative and object-centering positions, and means to move said object engaging means between said positions.

2. The apparatus of claim 1 and object-ejecting means movable between inoperative and a second position, the second position effecting object ejection if the object engaging means is inoperatively positioned, and means to move said ejecting means between said positions.

3. The apparatus of claim 1 in which the object-ejecting means comprises front and rear chocks and the means to move them comprises fluid pressure operated means, one for each chock and operable independently of the other.

4. The apparatus of claim 3 in which the fluid pressure operated means for the rear chock provides a stop position therefor.

5. In apparatus for moving heavy cylindrical objects between a first level, and a second vertically spaced level at which there is a marginal shoulder, a load supporting table, means centrally of and below said table to move said table vertically between said levels, said table being spaced transversely from said shoulder at said second level, said table including a plate hingedly connected to one side thereof, means to move said plate between a depending inoperative position at said first level and an approximately horizontal, operative position at said second level, said plate being dimensioned partially to close the gap between said table and said shoulder when in said operative position, said plate including a slide, means to move said slide relative to said plate between a retracted position and an operative position in which it may overlie and be supported by said shoulder while being rigidly secured to said plate whereby said shoulder becomes a second supporting means for said table, object engaging means carried by said table for movement between inoperative and operative object centering positions, and means to move said object engaging means between said positions.

6. The apparatus of claim 5 in which the moving means for the table and the plate are both hydraulically operated and each includes electrically operated control means, and an operating circuit includes the control means, operating switches, and a limit switch closed by the plate when in its depending, inoperative position, the circuit then being completed relative to the control means for the table by operation of the appropriate operating switch.

7. The apparatus of claim 6 in which the circuit to the control means for the crossover plate includes a limit switch by the table operated at or above a predetermined, partly raised table position to close the circuit for upward movement of the plate on the closing of the appropriate operating switch.

8. The apparatus of claim 7 in which the table operated limit switch is operated below the predetermined table level to complete the circuit for downward movement of the plate.

9. The apparatus of claim 7 in which the moving means for the slide is also hydraulically operated and includes electrically operated control means and operating switches in the operating circuit, and a limit switch closed by the crossover plate in a raised position, the circuit then being completed for extending the slide by the operation of the appropriate operating switch.

10. The apparatus of claim 9 and a limit switch in the circuit operated by the slide in an extended position to open the circuit to the control means for the crossover plate.

11. The apparatus of claim 7 in which the moving means for the slide is also hydraulically operated and includes electrically operated control means, a first lead includes a limit switch closed by the crossover plate in a partially raised position, an operating switch, a holding circuit therefor, a relay closed by the operating switch of the first lead, a second lead includes a limit switch closed by the crossover plate in the fully raised position thereof, an operating switch and the control means for the slide, the circuit being completed to effect the extension of the slide by the operation of the second lead operating circuit, and a third lead includes a limit switch closed when the slide is in an extended position and a relay, the relay of the first lead closing the first lead holding circuit and the two relays, when energized co-operating in opening the circuit to the control means for the crossover plate.

12. The apparatus of claim 11 in which the relay of the third lead includes a normally closed switch in control of the circuitry effecting slide extension.

13. The apparatus of claim 7 and a lead to the control means by which the slide is retracted, said lead including a limit switch closed when the table is at or below its partly elevated position.

14. The apparatus of claim 11 and a fourth lead in parallel with the first lead includes a third relay and an operating switch, a holding circuit for the fourth lead switch operated by the third relay, and a fifth lead includes a limit switch closed when the slide is further extended and a relay, the relays of the fourth and fifth leads cooperating in opening the circuit to the control means for the crossover plate.

15. The apparatus of claim 5 in which the object engaging means comprise front and rear chocks, and the moving means therefor are hydraulically operated, one for each chock and including electrically operated, raising and lowering controls, and a chock position selector switch, first, second, third and fourth parallel leads controlled by said selector switch, each parallel lead includes a relay, separate raising and lowering leads for the controls of the chock moving means, each including three parallel and normally open switches, normally closed limit switches, one in series with the second switch of the front chock raising lead and opened by the front chock when raised to a predetermined extent and the other in series with the second switch of the rear chock lowering means and opened when the rear chock has been raised to said extent, the relay of the first lead includes the first of the normally open switches in both lowering leads, the relay of the second lead includes the second normally open switch in the lowering lead for the second chock and the second switch of the raising lead for the front chock, the relay of the third lead includes the second switch of the front chock raising lead and second switch of the rear chock lowering lead, and the relay of the fourth lead includes the third switch of the front chock raising lead and the third lead of the rear chock lowering lead.

References Cited

UNITED STATES PATENTS

| | | | |
|---|---|---|---|
| 1,288,567 | 12/1918 | Hall. | |
| 1,452,608 | 4/1923 | Kirst | 214—99 |
| 2,204,023 | 6/1940 | Mason. | |
| 2,790,567 | 4/1957 | Rockhill | 214—95 |
| 3,268,932 | 8/1966 | Hartman | 14—71 |

ALBERT J. MAKAY, *Primary Examiner.*